US009847996B1

(12) United States Patent
Whitmore et al.

(10) Patent No.: US 9,847,996 B1
(45) Date of Patent: *Dec. 19, 2017

(54) SYSTEM, METHOD, AND COMPUTER-READABLE MEDIUM THAT FACILITATE VOICE BIOMETRICS USER AUTHENTICATION

(71) Applicant: West Corporation, Omaha, NE (US)

(72) Inventors: Andrea Whitmore, Omaha, NE (US); Aaron Scott Fisher, Omaha, NE (US); Steven John Schanbacher, Omaha, NE (US); Andrew Lawrence Groothuis, Omaha, NE (US); Jacob Ginsburg, Omaha, NE (US); Gerald Thomas Annin, Omaha, NE (US); Pamela J. Jacobs, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/880,432

(22) Filed: Oct. 12, 2015

Related U.S. Application Data (63) Continuation of application No. 14/084,989, filed on Nov. 20, 2013, now Pat. No. 9,160,849, which is a continuation of application No. 12/537,347, filed on Aug. 7, 2009, now Pat. No. 8,620,666.

(51) Int. Cl.
*H04L 29/06* (2006.01)
*G10L 15/08* (2006.01)

(52) U.S. Cl.
CPC ........ *H04L 63/0861* (2013.01); *G10L 15/083* (2013.01); *H04M 2203/6045* (2013.01)

(58) Field of Classification Search
CPC ..................................................... G10L 17/00
See application file for complete search history.

(56) References Cited

U.S. PATENT DOCUMENTS

| | | | | |
|---|---|---|---|---|
| 6,073,101 A * | 6/2000 | Maes | .................... | G10L 15/065 704/231 |
| 6,107,935 A * | 8/2000 | Comerford | ........ | G07C 9/00158 340/5.52 |
| 6,111,517 A * | 8/2000 | Atick | ..................... | G06F 21/32 340/5.83 |
| 6,219,639 B1 * | 4/2001 | Bakis | ................. | G06K 9/00885 382/116 |
| 6,480,825 B1 * | 11/2002 | Sharma | ............. | G07C 9/00158 704/270 |
| 6,529,871 B1 * | 3/2003 | Kanevsky | ............... | G10L 17/24 379/88.02 |
| 6,799,163 B2 * | 9/2004 | Nolan | ..................... | G10L 17/06 379/88.02 |
| 6,816,836 B2 * | 11/2004 | Basu | .................. | G06K 9/00228 382/100 |
| 7,415,410 B2 * | 8/2008 | Campbell | ............... | G10L 17/06 704/246 |

(Continued)

*Primary Examiner* — Douglas Godbod (57) ABSTRACT

A system, method, and computer readable medium that facilitate user authentication via voice biometrics in a network system featuring interactive voice response system access is provided. The voice biometric authentication mechanisms alleviate identity theft occurring via specific interactive voice response transactions. A voice biometrics authentication system interfaces with an interactive network platform and may be hosted by a third party provider of voice biometric technologies.

13 Claims, 5 Drawing Sheets

(56) References Cited

U.S. PATENT DOCUMENTS

| | | | | |
|---|---|---|---|---|
| 7,577,986 | B2* | 8/2009 | Himmel | G06F 21/6218 |
| | | | | 713/182 |
| 7,925,511 | B2* | 4/2011 | Li | A61B 5/14551 |
| | | | | 607/2 |
| 8,620,666 | B1* | 12/2013 | Whitmore | H04M 1/271 |
| | | | | 704/246 |
| 9,160,849 | B1* | 10/2015 | Whitmore | H04M 1/271 |
| 2003/0018475 | A1* | 1/2003 | Basu | G06K 9/00228 |
| | | | | 704/270 |
| 2003/0229492 | A1* | 12/2003 | Nolan | G10L 17/06 |
| | | | | 704/247 |
| 2004/0059590 | A1* | 3/2004 | Mercredi | H04L 63/0815 |
| | | | | 726/5 |
| 2007/0106517 | A1* | 5/2007 | Cluff | G10L 17/10 |
| | | | | 704/273 |
| 2007/0192103 | A1* | 8/2007 | Sato | G10L 25/78 |
| | | | | 704/253 |
| 2009/0046841 | A1* | 2/2009 | Hodge | H04M 1/67 |
| | | | | 379/189 |
| 2009/0055193 | A1* | 2/2009 | Maislos | G06F 21/32 |
| | | | | 704/273 |
| 2010/0291909 | A1* | 11/2010 | Nagaraja | H04M 1/575 |
| | | | | 455/415 |
| 2010/0328035 | A1* | 12/2010 | Hanley | G07C 9/00158 |
| | | | | 340/5.84 |

* cited by examiner

SYSTEM, METHOD, AND COMPUTER-READABLE MEDIUM THAT FACILITATE VOICE BIOMETRICS USER AUTHENTICATION

CROSS-REFERENCE TO RELATED APPLICATIONS

This application is a continuation from U.S. patent application Ser. No. 14/084,989, filed Nov. 20, 2013, and entitled "SYSTEM, METHOD, AND COMPUTER-READABLE MEDIUM THAT FACILITATE VOICE BIOMETRICS USER AUTHENTICATION", which is a continuation from U.S. patent application Ser. No. 12/537,347, filed Aug. 7, 2009, and entitled "SYSTEM, METHOD, AND COMPUTER-READABLE MEDIUM THAT FACILITATE VOICE BIOMETRICS USER AUTHENTICATION", now issued U.S. Pat. No. 8,620,666, the entire contents of each of which is incorporated by reference herein in its entirety.

FIELD OF THE INVENTION

The present invention is generally related to interactive network services and, more particularly, to voice biometric authentication mechanisms.

BACKGROUND OF THE INVENTION

Call centers are used by many industries to provide information by voice communication to a large number of customers or other interested parties. Telemarketing companies, for example, use call centers to process both inbound and outbound calls, mostly concerning offers of goods and services, but also to provide other information for company clients. Banks and financial institutions also use call centers, as do manufacturing companies, travel companies (e.g., airlines, auto rental companies, etc.), and virtually any other business having the need to contact a large number of customers, or to provide a contact point for those customers.

A typical call center will have a front end with one or more voice response units (VRU), call switching equipment, an automatic call distributor (ACD), and several work stations having a telephone and computer terminal at which a live operator processes the call. A caller may interact with an interactive voice response (IVR or VRU) system to effectuate a commercial transaction. For example, the caller may be prompted to identify themselves, such as through entry of a customer number as it may appear on a mail order catalog or another customer identifier.

Disadvantageously, customer identification information may be obtained by a malicious entity that may then fraudulently access a user account. Identity theft is motivating institutions to employ new and sophisticated methods of authenticating their customers. This spans the marketplace from government, financial, healthcare, insurance, mobile service industries, and various other industries. However, contemporary systems provide no automated tools to help diagnose fraudulent interactive voice response usage.

Therefore, what is needed is a mechanism that overcomes the described problems and limitations.

SUMMARY OF THE INVENTION

The present invention provides a system, method, and computer readable medium that facilitate user authentication via voice biometrics in a network system featuring interactive voice response system access. The voice biometric authentication mechanisms alleviate identity theft occurring via specific interactive voice response transactions. A voice biometrics authentication system interfaces with an interactive network platform and may be hosted by a third party provider of voice biometric technologies.

In one embodiment of the disclosure, a method for authenticating a user in a network system via voice biometrics is provided. The method includes storing a voiceprint of a first user, receiving an attempt for access to an application service by a user, identifying the voiceprint as associated with an identity of the first user and the attempt for access to the application service, obtaining a voice sample from the user, performing an evaluation of vocal characteristics of the voiceprint with vocal characteristics of the voice sample, and determining that the user is one of the first user or a fraudulent user based on results of the evaluation of vocal characteristics of the voiceprint with vocal characteristics of the voice sample.

In another embodiment of the disclosure, a computer-readable medium having computer-executable instructions for execution by a processing system, the computer-executable instructions for authenticating a user in a network system via voice biometrics, is provided. The computer-readable medium comprises instructions that, when executed by the processing system, cause the processing system to store a voiceprint of a first user, assign an interactive voice response application as an attribute of the voiceprint, receive an attempt for access to an application service by a user, identify the voiceprint as associated with an identity of the first user and the attempt for access to the application service, obtain a voice sample from the user, perform an evaluation of vocal characteristics of the voiceprint with vocal characteristics of the voice sample, and determine that the user is one of the first user or a fraudulent user based on results of the evaluation of vocal characteristics of the voiceprint with vocal characteristics of the voice sample.

In a further embodiment of the disclosure, a system for authenticating a user in a network system via voice biometrics is provided. The system includes an application server that hosts a plurality of service applications, an interactive voice response system communicatively coupled with the application server that provides voice response access to one of more of the plurality of service applications, and a voice biometrics authentication system communicatively coupled with the interactive voice response system that stores a voiceprint of a first user. The interactive voice response system receives an attempt for access to a service application by a communication device of a user and communicatively couples the communication device with the voice biometrics authentication system. The voice biometrics authentication system identifies the voiceprint as associated with an identity of the first user and the attempt for access to the application service, obtains a voice sample from the user, performs an evaluation of vocal characteristics of the voiceprint with vocal characteristics of the voice sample, and determines that the user is one of the first user or a fraudulent user based on results of the evaluation of vocal characteristics of the voiceprint with vocal characteristics of the voice sample.

BRIEF DESCRIPTION OF THE DRAWINGS

Aspects of the present disclosure are best understood from the following detailed description when read with the accompanying figures, in which.

DETAILED DESCRIPTION OF THE INVENTION

It is to be understood that the following disclosure provides many different embodiments or examples for implementing different features of various embodiments. Specific examples of components and arrangements are described below to simplify the present disclosure. These are, of course, merely examples and are not intended to be limiting.

In accordance with embodiments, clients of a network system featuring interactive voice response (IVR) system access are provided with various voice biometric authentication mechanisms that alleviate identity theft occurring via specific IVR transactions. The disclosed embodiments provide mechanisms that interface with an interactive network platform and a third party provider of voice biometric technologies. The disclosed mechanisms eliminate, or significantly reduce, fraudulent access by imposters to accounts via an IVR system. The described mechanisms provide a voice identification mechanism that effectively provides biological authentication of an individual.

The authentication mechanisms preferably, in part, rely on known information, such as an account number, phone number, birthday, token certificates, etc., used in conjunction with the biometrics of the user's voice. Using the characteristics of an individual's voice to verify the caller identity advantageously restricts imposters and improves correct authentication of users.

Figure 1:
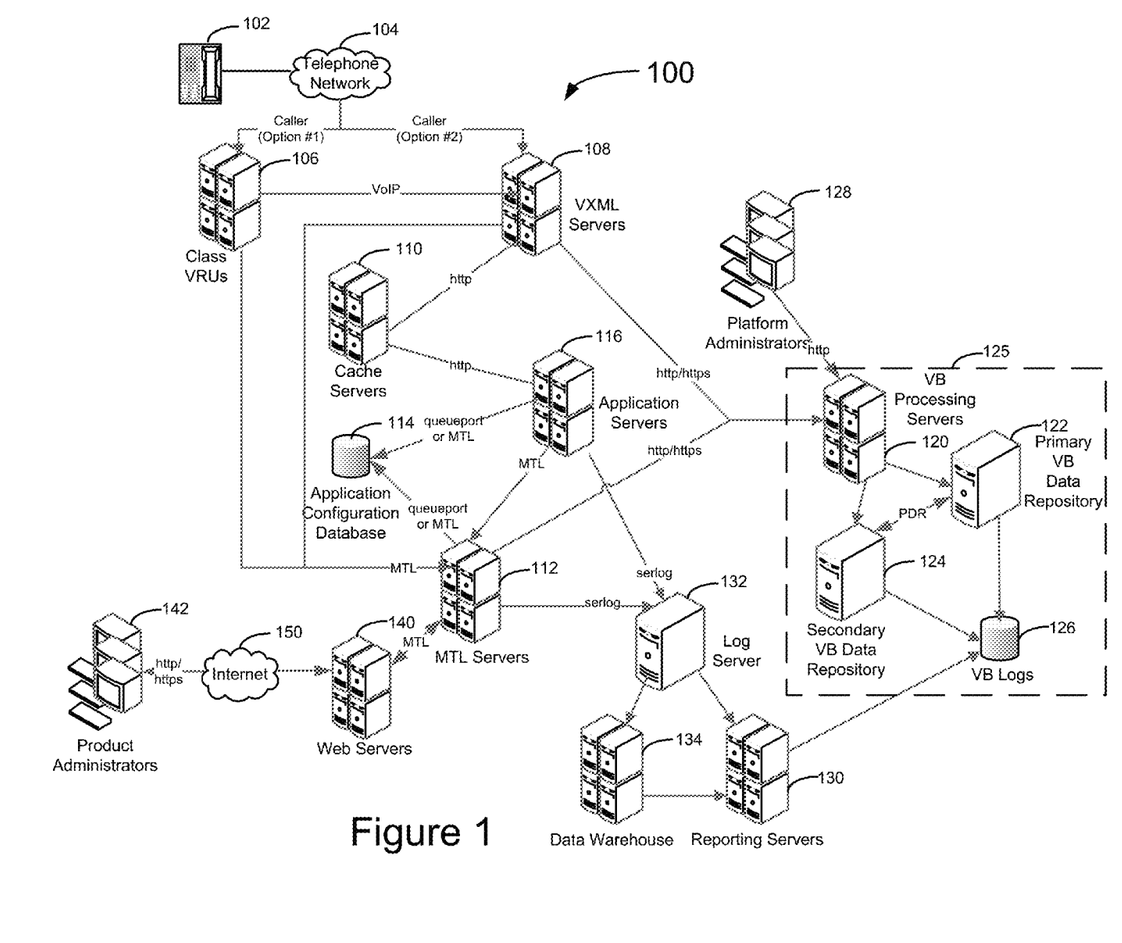
FIG. 1 is a diagrammatic representation of a network system that features a voice biometrics authentication platform implemented in accordance with an embodiment.

FIG. 1 is a diagrammatic representation of a network system 100 that features a voice biometrics authentication platform implemented in accordance with an embodiment. A user, e.g., at a telephone or other communication device 102, accesses system 100 via, for example, a telephone network 104, such as the Public Switched Telephone Network (PSTN). For example, a user may call a toll-free telephone number, such as an 800 number, that is determined by the carrier as being associated with the network system 100. The system may provide various options to the system for selection by the user. In an embodiment, the user may be connected with a Voice Response Unit (VRU) 106 and/or a server 108 that provides VoiceXML (VXML) browsers that facilitate interactive voice dialogues. The VRU 106 and server 108 hosting VXML browsers may be communicatively coupled, e.g., via a Voice over Internet Protocol (VoIP) interface. Server 108 may be communicatively coupled with cache servers 110, e.g., for communication exchanges made, by way of example, via Hypertext Transfer Protocol (HTTP) exchanges. The VRU 106 and VXML browser server 108 may be included in an IVR call center front end that facilitates processing of a call. The VRU 106 and VXML browser server 108 may provide voice response menus to the user to submit, for example, a user identification, a desired application or entity with which the user wishes to interact, and the like. The server 108 may further be communicatively coupled with Message Transport Layer (MTL) servers 112. The MTL servers 112 may be communicatively coupled with an application configuration database 114 as well as application servers 116 which may be communicatively coupled with the cache servers 110 and the application configuration database 114. Application servers 116 may host service applications, such as banking services, shopping services, insurance services, or any other entity service. The VXML browsers 108 and MTL servers 112 may each be communicatively coupled with a voice biometric (VB) processing server 120 which is communicatively coupled with a primary VB data repository 122 and a secondary VB data repository 124. Further, the VB processing server 120 may be communicatively interfaced with various platform administrator systems 128. Each of the primary and secondary VB data repositories 122 and 124 may be interfaced with a VB log database 126 that stores voice biometric data processing logs or records of VB user authentications. The VB processing servers 120, primary VB data repository 122, secondary VB repository 124, and VB logs 126 collectively comprise a voice biometrics authentication system 125 that facilitates user authentication via voice biometrics evaluated by way of algorithmic processing of a voice signature of a user and a voice sample provided by the user when attempting authentication. The VB biometrics authentication system 125 may be hosted by a third party to facilitate VB authentication for any number of entities being serviced by the call center of the system 100.

The VB log database 126 may be communicatively coupled with one or more reporting servers 130. The reporting servers 130 may be communicatively coupled with a log server 132 and a data warehouse 134 that are each coupled with one another. The log server 132 may be communicatively interfaced with the application servers 116 as well as the MTL servers 112. Web servers 140 may interface with product administrator systems 142, e.g., via the Internet 150 or another suitable network infrastructure.

Figure 2:
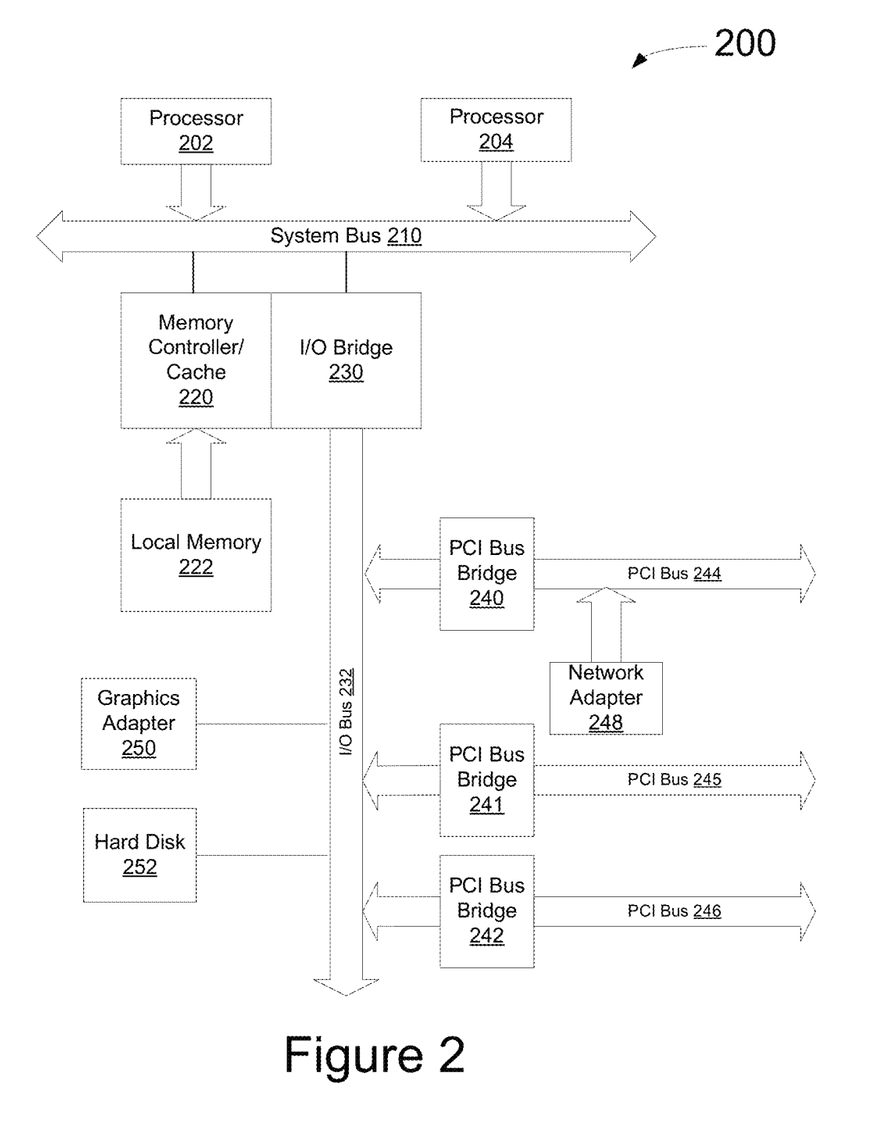
FIG. 2 is a block diagram of a data processing system that may be implemented as a server in accordance with an embodiment of the present invention.

FIG. 2 is a block diagram of a data processing system 200 that may be implemented as a server, such as VB processing server 120 in FIG. 1, in accordance with an embodiment of the present invention. Data processing system 200 may be a symmetric multiprocessor (SMP) system including a plurality of processors 202 and 204 connected to system bus 210. Alternatively, a single processor system may be employed. Also connected to system bus 210 is memory controller/cache 220, which provides an interface to local memory 222. An I/O bus bridge 230 is connected to system bus 210 and provides an interface to I/O bus 232. Memory controller/cache 220 and I/O bus bridge 230 may be integrated as depicted.

A peripheral component interconnect (PCI) bus bridge 240 may be connected to I/O bus 232 and provides an interface to PCI local bus 244. Additional PCI bus bridges 241-242 provide interfaces for additional PCI local buses 245-246, from which additional network adapters or other peripherals may be supported. In this manner, data processing system 200 allows connections to multiple network computers. A memory-mapped graphics adapter 250 and hard disk 252 may also be connected to I/O bus 232 as depicted, either directly or indirectly. VB data repository 122 depicted in FIG. 1 may be network-connected with system 200 and thereby accessible through network adapter 248. Alternatively, VB data repository 122 may be interconnected with system 200, e.g., via I/O bus 232.

Those of ordinary skill in the art will appreciate that the hardware depicted in FIG. 2 may vary. For example, other peripheral devices, such as optical disk drives and the like, also may be used in addition to or in place of the hardware depicted, and any variety of server architectures may be substituted for the depicted implementation. The depicted example is not meant to imply architectural limitations with respect to the present invention.

Figure 3:
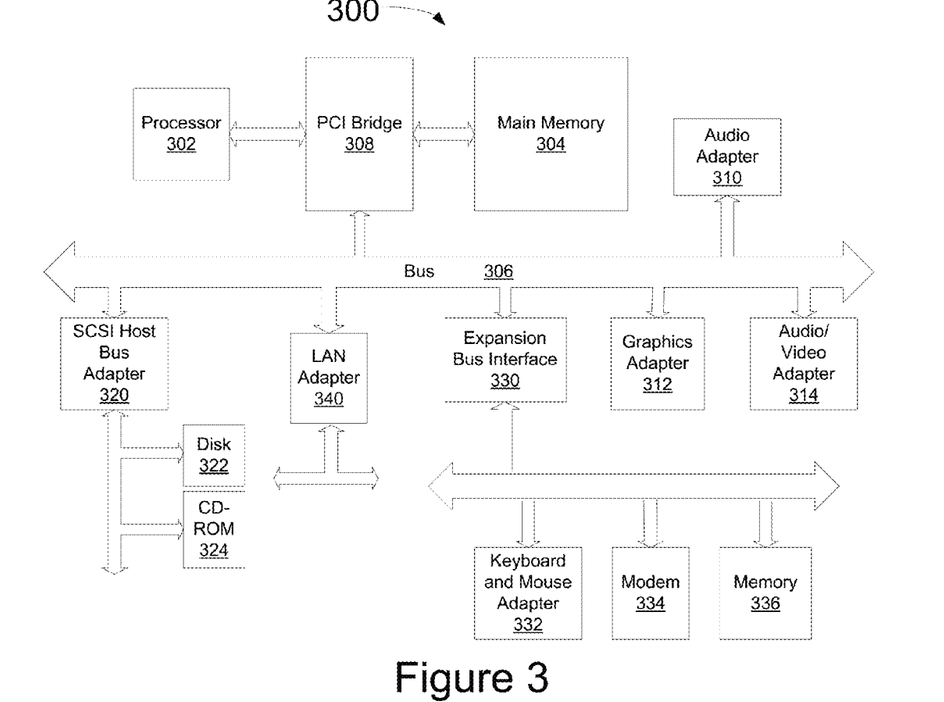
FIG. 3 is a diagrammatic representation of a data processing system that may be implemented as a client system in accordance with an embodiment.

FIG. 3 is a diagrammatic representation of a data processing system 300 that may be implemented as a client system, such as, for example, a platform administrator 128 client system or a product administrators 142 client system depicted in FIG. 1, in accordance with an embodiment. In the illustrative example, data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. A processor 302 and a main memory 304 are connected to a PCI local bus 306 through a PCI bridge 308. PCI bridge 308 also may include an integrated memory controller and cache memory for processor 302. Additional connections to PCI local bus 306 may be made through direct component interconnection or through add-in boards. In the depicted example, a local area network (LAN) adapter 340, a SCSI host bus adapter 320, and an expansion bus interface 330 are connected to PCI local bus 306 by direct component connection. In contrast, an audio adapter 310, a graphics adapter 312, and an audio/video adapter 314 are connected to PCI local bus 306 by add-in boards inserted into expansion slots. Expansion bus interface 330 provides a connection for a keyboard and mouse adapter 332, a modem 334, and additional memory 336. A small computer system interface (SCSI) host bus adapter 320 provides a connection for a hard disk drive 322 and a CD-ROM drive 324. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. Instructions for the operating system and applications or programs are located on storage devices, such as hard disk drive 322, and may be loaded into main memory 304 for execution by processor 302.

Those of ordinary skill in the art will appreciate that the hardware in FIG. 3 may vary depending on the implementation, and any variety of personal computer architecture or other data processing system devices may be suitably substituted for those depicted and described. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

In accordance with an embodiment, a speaker is authenticated based on voice biometrics, i.e., physical characteristics of the speaker's voice. Speakers supplying voice samples for evaluation may comprise, for example, employees, consumers, customers or live operator agents.

For a new speaker program, a user is preferably allowed to set configuration(s) used to define related data elements with interfacing systems and function settings within the web product. The client may preferably prompt the speaker candidate to call an IVR in order to enroll a client voiceprint that provides a voice signature of the speaker used for future user verifications. Once a user has enrolled successfully, the user will be prompted to provide a voice sample on subsequent system access. The system then compares the user sample supplied for verification with the stored voiceprint to determine if the speaker is the original individual or, alternatively, an imposter. Imposters, i.e., a user that has supplied a voice sample identified as fraudulent, may then be advantageously restricted from gaining system access.

During verification, a speaker may be incorrectly identified as an imposter. This may be attributed to poor voice quality in the connection, the speaker failing to accurately speak their voice sample, additional background voices or noises, illness, or drastic changes in the speakers voice. In this instance, the speaker may be prompted to attempt verification again. In the event voice biometric authentication continues to fail, alternate verification methods may be selected other than voice verification. Due to natural changes in voice as people age, it may be desirable to re-enroll users in order to maintain the usefulness of their voiceprint. A user operating at a system client may elect to use a program setting that will work with the IVR to prompt speakers for re-enrollment after a pre-defined period. In some instance, there will be speakers whose roles may change that result in their voiceprint no longer being of use. A system client may elect to use a program setting that will automatically expire a speaker and expire voiceprints after a pre-defined period. The client may also be interested in finding out which speakers have been targeted by imposters. To this end, the client may elect to use a program setting that will notify them after a maximum consecutive failed verification attempts for the speaker. Special attention is paid to ensure playback detection. For every verification, the system stores an entity referred to as a "footprint" which is a miniature representation of the voice file. It then compares the footprint to the next "footprint" obtained when the same caller is being verified again—and if they are similar enough—the verification is rejected.

Figure 4:
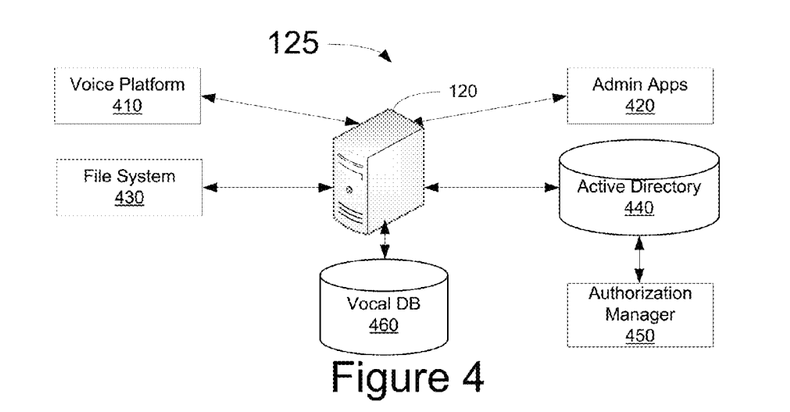
FIG. 4 is a diagrammatic representation of an exemplary hardware and software configuration of the voice biometrics authentication system implemented in accordance with an embodiment.

FIG. 4 is a diagrammatic representation of an exemplary hardware and software configuration of the voice biometrics authentication system 125 depicted in FIG. 1 implemented in accordance with an embodiment.

The authentication system 125 includes a voice biometrics processing server 120 that is communicatively interfaced with a voice platform 410, e.g., VRU server 106 and/or VXML server 108. The voice biometrics processing server 120 may host an instance of Internet Information Services (IIS). Administration applications 420 may communicatively interface with the processing server 120 and facilitate administrator configuration of various system applications. The administrator applications 420 may be implemented as computer executable instructions stored on a tangible storage medium that are accessible and executable by a data processing system, such as the processing server 120 and/or administrator systems 128. A file system 430 may be hosted or interfaced by processing server 120. The file system 430 may manage the storage and retrieval of hashed audio files that facilitate voice biometric authentication of users. An active directory 440 may be interfaced with the processing sever 120 and may facilitate audit, authentication, and authorization of users attempting to access a system or application via voice interactive processing systems. An authorization manager 450 may be communicatively interfaced with the active directory 440. For example, communications may be made between the active directory 440 and the authorization manager 450 by way of Lightweight Directory Access Protocol (LDAP) communications. A vocal database 460 may further be communicatively interfaced with the processing server 120. The vocal database 460 or the active directory 440 may store voiceprints submitted by users that are to facilitate provisioning of voice biometric authentication.

In an embodiment, the call center front end, e.g., VRU 106 and/or VXML server 108 may provide an initial identification of a user, e.g., calling from device 102. The initial identification may be made, for example, by way of an account number, phone number, birthday, token certificates, or other information provided by the user at device 102. The call center front end may then identify a particular service desired to be accessed by the user. Thereafter, the call center may direct the call to the appropriate service application hosted by application servers 116. In the event that voice biometric authentication mechanisms are required for the desired service, the call may be directed to the authentication system 125. The VB processing server 120 may then obtain the voiceprint associated with the particular user and prompt the user for a voice sample. The voiceprint may be obtained, for example, from the vocal database 460, or the Active directory 440, and may comprise one or more speaker audio segments (voice files). The VB processing server 120 then attempts VB authentication of the speaker by way of algorithmic processing that invokes a verification formula for speaker verification. The verification formula may generate a binary positive or negative user verification result or, alternatively, may produce a verification numerical score that indicates a measure of the certainty of the speaker verification. The verification numerical score may then be compared with a threshold associated with the service application to which the user desires access or may alternatively be associated with the particular user. The verification result is then determined based on whether the score is above or below the threshold.

Figure 5:
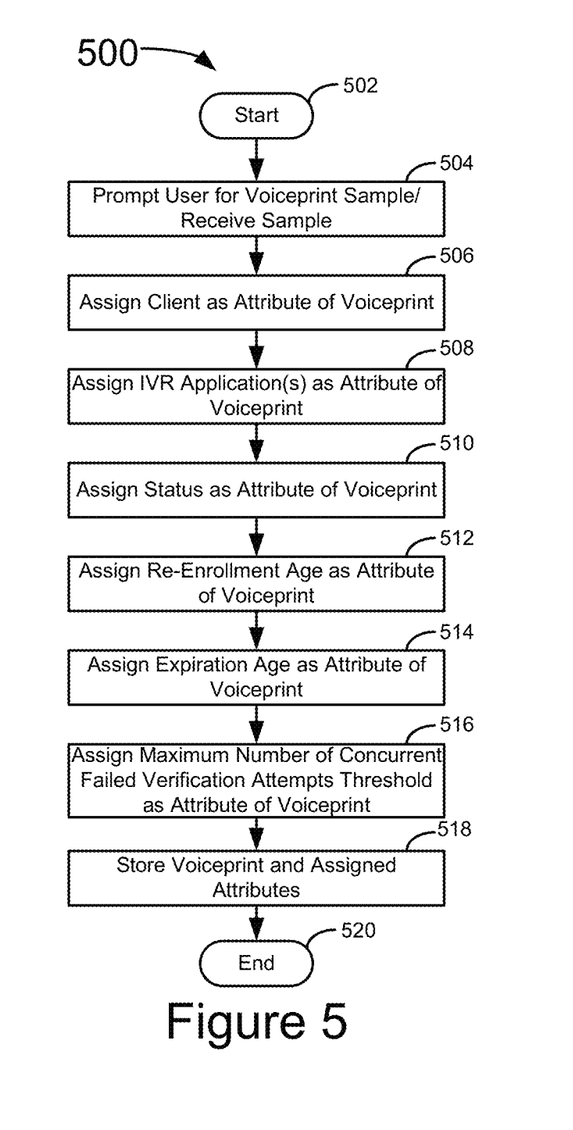
FIG. 5 is a flowchart that depicts processing of a biometric enrollment routine that facilitates voiceprint user authentication in accordance with disclosed embodiments.

FIG. 5 is a flowchart 500 that depicts processing of a biometric enrollment routine that facilitates voiceprint user authentication in accordance with disclosed embodiments. The processing steps of FIG. 5 may be implemented as computer-executable instructions tangibly embodied on a computer-readable medium executable by a processing system, such as the voice biometrics processing server 120 depicted in FIGS. 1 and 4.

The biometric enrollment routine is invoked (step 502), and the user is prompted for one or more voiceprint samples that provide a voice signature to be utilized for user verification (step 504). A client is then assigned as an attribute of the voiceprint sample (step 506). For example, the client assigned as an attribute of the voiceprint sample may comprise a client identifier or name of a client entity or application, such as a banking application, an insurance provider application, or any other suitable application hosted by application servers 116. An IVR application may be assigned as a voiceprint attribute (step 508). For example, an identifier of a particular IVR associated with a client or client application may be assigned as an attribute of the voiceprint sample. A status of the voiceprint sample may be associated with the voiceprint sample as an attribute thereof (step 510). For example, the status may be set to active or inactive indicating whether the voiceprint is to be used for biometric authentication of a user. In an embodiment, the status of a voiceprint sample may default to an active status. A re-enrollment age may be assigned as an attribute of the voiceprint sample (step 512). For example, the user may be prompted for a re-enrollment age or, alternatively, a default re-enrollment age may be assigned as an attribute of the voiceprint sample. Upon expiration of the re-enrollment age, the user is then required to re-enroll in the biometric verification process. An expiration age may also be assigned as an attribute of the voiceprint sample (step 514). For example, the expiration age may be supplied by the user during the enrollment process or, alternatively, a default expiration age may be assigned as an attribute of the voiceprint sample. Upon expiration of the expiration age, the voiceprint sample may be deleted or otherwise designated for non-use, and the user may then be required to resubmit one or more voiceprint samples to be used for biometric verification. A maximum number of concurrent failed verification attempts may be assigned as an attribute of the supplied voiceprint (step 516). For example, the maximum number of concurrent failed verification attempts may be supplied by the user during the enrollment process or, alternatively, a default maximum number of concurrent failed verification attempts may be assigned as an attribute of the voiceprint sample. The voiceprint and associated attributes are then stored (step 518), e.g., in the vocal database 460, and the enrollment routine cycle may then end (step 520).

Figure 6:
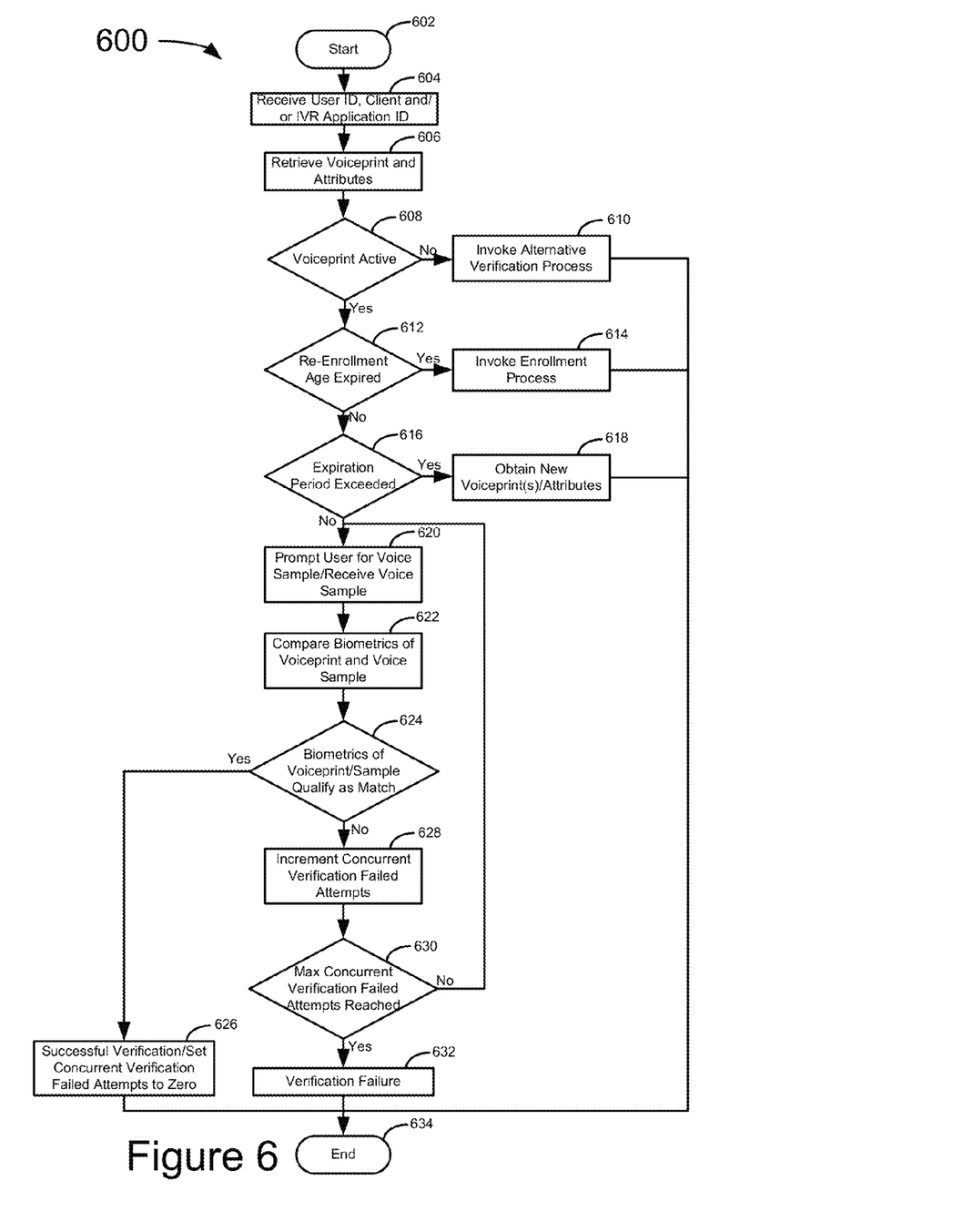
FIG. 6 is a flowchart of a voice biometrics authentication routine implemented in accordance with an embodiment.

FIG. 6 is a flowchart 600 of a voice biometrics authentication routine implemented in accordance with an embodiment. The processing steps of FIG. 6 may be implemented as computer-executable instructions tangibly embodied on a computer-readable medium executable by a processing system, such as the voice biometrics processing server 120 depicted in FIGS. 1 and 4.

The authentication routine is invoked (step 602) and a user ID along with a Client ID and/or IVR Application ID is received (step 604). The voiceprint associated with the user ID and corresponding to the Client ID and/or the IVR Application ID is then retrieved, e.g., from the vocal database 460, along with the voiceprint attributes (step 606). The active status attribute is then evaluated to determine if the voiceprint is active for voice biometric evaluation (step 608). In the event the voiceprint is inactive, the authentication routine may then invoke an alternative verification process (step 610), and the authentication routine cycle may then end (step 634).

Returning again to step 608, in the event the voiceprint status is active, the authentication routine may then evaluate the re-enrollment age attribute of the voiceprint to determine if the voiceprint re-enrollment age indicates the voiceprint has expired (step 612). If the voiceprint enrollment period has expired, the authentication routine may then invoke the enrollment process, e.g., as described above with reference to FIG. 5, to re-enroll the user for voice biometrics verification (step 614). The authentication routine cycle may then end according to step 634.

Returning again to step 612, if the re-enrollment age of the voiceprint has not expired, the authentication routine may then evaluate the expiration period attribute of the voiceprint to determine if the voiceprint has expired (step 616). If the voiceprint has expired, the authentication routine may then obtain new voiceprint(s) from the user and store the new voiceprints for voice biometric evaluations of the user (step 618). Accordingly, the authentication routine may delete the previously stored voiceprint(s) and store the newly supplied voiceprint(s) in place of the deleted voiceprints. The authentication routine cycle may then end according to step 634.

Returning again to step 616, if the voiceprint(s) have not expired, the authentication routine may then prompt the user for a voice sample and receive the supplied voice sample (step 620). The authentication routine may then compare voice biometric characteristics of the voiceprint and voice biometric characteristics of the supplied sample (step 622). To this end, the VB processing server 120 may invoke a verification formula that may generate a binary positive or negative user verification result or, alternatively, may produce a verification numerical score that is compared with a verification threshold. An evaluation may then be made to determine if the biometric characteristics of the voiceprint and those of the supplied sample sufficiently qualify the user having supplied the sample as a match of the user associated with the voiceprint (step 624). If the evaluation determines the biometric characteristics of the voiceprint and sample sufficiently qualify as a match, the authentication routine may then successfully verify the user identity and may set the concurrent verification failed attempts attribute of the voiceprint to zero (step 626). The authentication routine cycle may then end according to step 634.

Returning again to step 624, if the biometric characteristics of the voiceprint and those of the supplied sample do not sufficiently qualify the user having supplied the sample as a match of the user associated with the voiceprint, the authentication routine may then increment the concurrent verification failed attempts attribute (step 628) and thereafter evaluate the concurrent verification failed attempts attribute to determine if the maximum concurrent verification failed attempts attribute has been reached (step 630). If the maximum concurrent verification failed attempts attribute of the voiceprint has not been reached, the authentication routine may then prompt the user for a voice sample and receive the supplied voice sample according to step 620. In the event the maximum concurrent verification failed attempts attribute of the voiceprint has been reached, the authentication routine may then provide a voice biometric verification failure indicating that the user is likely a fraudulent user (step 632). The authentication routine cycle may then end according to step 634.

As described, a system, method, and computer readable medium that facilitate user authentication via voice biometrics in a network system featuring interactive voice response system access are provided. The voice biometric authentication mechanisms alleviate identity theft occurring via specific interactive voice response transactions. A voice biometrics authentication system interfaces with an interactive network platform and may be hosted by a third party provider of voice biometric technologies.

The flowcharts of FIGS. 5-6 depict process serialization to facilitate an understanding of disclosed embodiments and are not necessarily indicative of the serialization of the operations being performed. In various embodiments, the processing steps described in FIGS. 5-6 may be performed in varying order, and one or more depicted steps may be performed in parallel with other steps. Additionally, execution of some processing steps of FIGS. 5-6 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single processor or multiple processors. Additionally, various steps of embodiments of the invention may provide one or more data structures generated, produced, received, or otherwise implemented on a computer-readable medium, such as a memory.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
   receiving an attempt for access to an application service by a user;
   when the application service is determined to be an assigned one of a plurality of interactive voice response applications:
   identifying a voiceprint of a first user as associated with an identity of the first user;
   obtaining a voice sample from the user; and
   determining that the user is one of the first user or a fraudulent user based on a result of an evaluation of vocal characteristics of the voiceprint with vocal characteristics of the voice sample;

wherein a determination is made whether the voiceprint has expired;

wherein responsive to the determination of the voiceprint being expired, obtaining a new voiceprint from the first user;

wherein an expiration age as an attribute of the voiceprint is assigned; and wherein the expiration age is evaluated responsive to receiving the attempt for access.

2. The method of claim 1, further comprising assigning a maximum number of sequential failed verification attempts threshold with the voiceprint.

3. The method of claim 2, further comprising:

performing an evaluation of vocal characteristics of the voiceprint with vocal characteristics of the voice sample;

responsive to performing the evaluation of vocal characteristics of the voiceprint with vocal characteristics of the voice sample, incrementing the maximum number of sequential failed verification attempts in the event the user is determined to be the fraudulent user; and determining if the maximum number of sequential failed verification attempts equals the maximum number of sequential failed verification attempts threshold.

4. The method of claim 3, further comprising generating a verification failure of the user responsive to determining the maximum number of sequential failed verification attempts equals the maximum number of sequential failed verification attempts threshold.

5. A non-transitory computer-readable medium having computer-executable instructions, when executed by a processing system, cause the processing system to:

receive an attempt for access to an application service by a user;

when the application service is determined to be an assigned one of a plurality of interactive voice response applications:

identify a voiceprint of a first user as associated with an identity of the first user;

obtain a voice sample from the user; and determine that the user is one of the first user or a fraudulent user based on results of an evaluation of vocal characteristics of the voiceprint with vocal characteristics of the voice sample;

wherein a determination is made whether the voiceprint has expired;

wherein responsive to the determination of the voiceprint being expired, obtaining a new voiceprint from the first user;

wherein an expiration age as an attribute of the voiceprint is assigned; and wherein the expiration age is evaluated responsive to receiving the attempt for access.

6. The non-transitory computer-readable medium of claim 5, further comprising instructions that, when executed, cause the processing system to assign a maximum number of sequential failed verification attempts threshold with the voiceprint.

7. The non-transitory computer-readable medium of claim 6, further comprising instructions that, when executed, cause the processing system to:

perform an evaluation of vocal characteristics of the voiceprint with vocal characteristics of the voice sample increment a maximum number of sequential failed verification attempts in the event the user is determined to be the fraudulent user responsive to the evaluation of vocal characteristics of the voiceprint with vocal characteristics of the voice sample; and determine if the maximum number of sequential failed verification attempts equals the maximum number of sequential failed verification attempts threshold.

8. The non-transitory computer-readable medium of claim 7, further comprising instructions that, when executed, cause the processing system to generate a verification failure of the user responsive to determining the maximum number of sequential failed verification attempts equals the maximum number of sequential failed verification attempts threshold.

9. A system, comprising:

an application server that hosts a plurality of service applications;

an interactive voice response system communicatively coupled with the application server that provides voice response access to one of more of the plurality of service applications; and a voice biometrics authentication system communicatively coupled with the interactive voice response system that receives an attempt for access to a service application by a communication device of a user, when the application service is determined to be an assigned one of the plurality of service applications communicatively couples the communication device with the voice biometrics authentication system, wherein the voice biometrics authentication system identifies a voiceprint of a first user as associated with an identity of the first user, obtains a voice sample from the user, and determines that the user is one of the first user or a fraudulent user based on a result of an evaluation of vocal characteristics of the voiceprint with vocal characteristics of the voice sample;

wherein a determination is made whether the voiceprint has expired;

wherein responsive to the determination of the voiceprint being expired, obtaining a new voiceprint from the first user;

wherein an expiration age as an attribute of the voiceprint is assigned; and wherein the expiration age is evaluated responsive to receiving the attempt for access.

10. The system of claim 9, wherein the voice biometrics authentication system assigns a maximum number of sequential failed verification attempts threshold with the voiceprint.

11. The system of claim 10, wherein the voice biometrics authentication system increments a maximum number of sequential failed verification attempts in the event the user is determined to be the fraudulent user.

12. The system of claim 11, wherein the voice biometrics authentication system determines if the maximum number of sequential failed verification attempts equals the maximum number of sequential failed verification attempts threshold.

13. The system of claim 12, wherein the voice biometrics authentication system generates a verification failure of the user responsive to determining the maximum number of sequential failed verification attempts equals the maximum number of sequential failed verification attempts threshold.

* * * * *